(12) United States Patent
Qu et al.

(10) Patent No.:     US 12,613,170 B2
(45) Date of Patent:         Apr. 28, 2026

(54) SAMPLE COOLING AND STORAGE METHOD

(71) Applicant: SHANGHAI ORIGINCELL BIOLOGICAL CRYO EQUIPMENT CO., LTD., Shanghai (CN)

(72) Inventors: Jianguo Qu, Shanghai (CN); Fei Long, Shanghai (CN)

(73) Assignee: SHANGHAI ORIGINCELL BIOLOGICAL CRYO EQUIPMENT CO., LTD., Shanghai (CN)

( * ) Notice: Subject to any disclaimer, the term of this patent is extended or adjusted under 35 U.S.C. 154(b) by 0 days.

(21) Appl. No.: 19/383,813

(22) Filed: Nov. 10, 2025

(65) Prior Publication Data

US 2026/0063522 A1     Mar. 5, 2026

Related U.S. Application Data

(63) Continuation-in-part of application No. PCT/CN2024/101285, filed on Jun. 25, 2024.

(30) Foreign Application Priority Data

Nov. 20, 2023    (CN) .......................... 202311542732.9

(51) Int. Cl.
     *G01N 1/42*              (2006.01)
(52) U.S. Cl.
     CPC ..................................... *G01N 1/42* (2013.01)
(58) Field of Classification Search
     CPC ....................................................... G01N 1/42
     See application file for complete search history.

(56) References Cited

U.S. PATENT DOCUMENTS 4,388,814 A * 6/1983 Schilling .................. G01N 1/42
                                                              62/51.1

FOREIGN PATENT DOCUMENTS

CN         113142193 A       7/2021
CN         215571512 U       1/2022
                  (Continued)

OTHER PUBLICATIONS

English Machine Translation of CN114903029 A (Year: 2022).*
English Machine Translation of WO 2022/237344 A1 (Year: 2022).*

*Primary Examiner* — David Z Huang
(74) *Attorney, Agent, or Firm* — Bayramoglu Law Offices LLC

(57)                ABSTRACT

A sample cooling and storage method is provided. A method of programmed cooling is divided into a method of cooling in several stages corresponding to a standard ambient cooling curve. In each stage of cooling, whether samples need to be raised or lowered is determined by checking whether an actual ambient temperature $T_1$ is equal to a target ambient temperature w, so that the actual ambient temperature $T_1$ is consistent with the target ambient temperature w, until the actual ambient temperature $T_1$ is consistent with a target temperature $T_2$ for this stage of cooling. After each stage of cooling in sequence, samples finally reach a temperature required for cryogenic storage, and are directly stored in a liquid nitrogen storage box. The sample cooling and storage method is capable of simultaneously realizing programmed cooling and sample storage, which is convenient for treating single-layer samples.

16 Claims, 14 Drawing Sheets

(56)          References Cited

FOREIGN PATENT DOCUMENTS

CN        114903029  A  *   8/2022    ............. A01N  1/162
CN        217509762  U       9/2022
CN        116951858  A      10/2023
CN        117581857  A       2/2024
WO    WO-2022237344  A1 *  11/2022    ............. A01N  1/162

* cited by examiner

B

A

SAMPLE COOLING AND STORAGE METHOD

CROSS REFERENCE TO THE RELATED APPLICATIONS

This application is a continuation-in-part application of International Application No. PCT/CN2024/101285, filed on Jun. 25, 2024, which is based upon and claims priority to Chinese Patent Application No. 202311542732.9, filed on Nov. 20, 2023, the entire contents of which are incorporated herein by reference.

TECHNICAL FIELD

The present disclosure relates to a biological sample storage method, in particular to a sample cooling and storage method.

BACKGROUND

To improve the livability of cell cryopreservation, the cells need to be gradually cooled to a predetermined temperature through a method of programmed cooling before storage. In FIG. 1, a curve A is a standard ambient cooling curve set for programmed cooling, and a curve B is an actual sample cooling curve. As can be seen from the figure, a programmed cooling process is divided into several stages, and therefore, a plurality of independent cooling apparatuses need to be arranged to perform stage-by-stage cooling on the cells respectively. To achieve the above objective, Chinese patent with a publication number of CN 217509762U discloses a sample programmed cooling apparatus in which a plurality of independent low-temperature storage boxes are connected in series through a transfer system so that cells can be transported among the plurality of low-temperature storage boxes and cooled to a target temperature based on a specific cooling rate of a programmed cooling stage in each low-temperature storage box, and finally the objective of programmed cooling is achieved.

As can be seen from the above description, the sample programmed cooling apparatus needs a plurality of independent dedicated cooling apparatuses for cooling samples. After cooling, there is also a need to transport the samples to the independent low-temperature storage equipment for storage. This has a good use effect when large quantities of biological samples are treated. When the single-layer samples are treated, the cooling process also needs to involve a plurality of dedicated apparatuses due to separation of programmed cooling and sample storage, and therefore the operation is relatively tedious, the single-layer samples are inconvenient to treat, and the use effect is relatively poor.

Therefore, it is needed to design a programmed cooling and storage method to simultaneously realize programmed cooling and sample storage, thereby improving the convenience for single-layer sample treatment.

SUMMARY

To address the above technical problem, the objective of the present disclosure is to provide a sample cooling and storage method which is capable of simultaneously realizing programmed cooling and sample storage, so as to facilitate the treatment of single-layer samples.

The present disclosure provides a sample cooling and storage method, including a step of placing samples into a liquid nitrogen storage box, wherein in the sample cooling and storage method, the samples are raised and lowered in the liquid nitrogen storage box via a lifting device, subjected to programmed cooling and then directly stored in the liquid nitrogen storage box after the programmed cooling, and a method of programmed cooling includes the following steps:

dividing programmed cooling into several stages of cooling which correspond to a standard ambient cooling curve and are performed in sequence, wherein each stage of cooling includes the following steps:

S1: setting a target ambient temperature w according to the standard ambient cooling curve;

S2: acquiring an actual ambient temperature $T_1$; and

S3: comparing the target ambient temperature w with the actual ambient temperature $T_1$ and controlling the raising and lowering of the samples;

lowering the samples by a predetermined height if the target ambient temperature w is higher than the actual ambient temperature $T_1$;

raising the samples by a predetermined height if the target ambient temperature w is lower than the actual ambient temperature $T_1$;

determining whether the actual ambient temperature $T_1$ is equal to a target temperature $T_2$ in this stage of cooling if the target ambient temperature w is equal to the actual ambient temperature $T_1$;

ending this stage of cooling if the actual ambient temperature $T_1$ is equal to the target temperature $T_2$ in this stage of cooling at the moment; and cyclically performing step S1 to step S3 if the actual ambient temperature $T_1$ is not equal to the target temperature $T_2$ in this stage of cooling at the moment, until the actual ambient temperature $T_1$ is equal to the target temperature $T_2$ in this stage of cooling.

Further, according to the sample cooling and storage method of the present disclosure, in each stage of cooling, a programmable logic controller controls output of a servo motor through a proportional-integral-derivative (PID) algorithm, and an operational regulation equation for the PID algorithm is as follows:

$$\Delta y = K_p \cdot s \cdot \left[ (b \cdot w - x) + \frac{1}{K_i \cdot s}(w - x) + \frac{K_d \cdot s}{a \cdot K_d \cdot s + 1}(c \cdot w - x) \right];$$

wherein, $\Delta y$ is an output value of the PID algorithm; $K_P$ is a proportional grain, s is a Laplacian operator, b is a proportional action weight, w is a set target ambient temperature, x is an actual ambient temperature where a sample is located, $K_i$ is integral action time, a is a derivative delay coefficient, $K_d$ is derivative action time, and c is a derivative action weight.

Further, according to the sample cooling and storage method of the present disclosure, the lifting device is a linear displacement actuator driven by a servo motor.

Further, according to the sample cooling and storage method of the present disclosure, the liquid nitrogen storage box is arranged in a sample storage apparatus, the sample storage apparatus includes a tank body, the top end of the tank body is provided with a tank cover, the inner cavity of the tank body is provided with a rotating frame, the rotating frame includes a frame body and a rotating spindle connected with the frame body, the bottom end of the rotating spindle is arranged on a bearing seat located in the center of the bottom of the tank body, the top end of the rotating spindle penetrates through the tank cover and is connected with an output shaft of a rotation driving device, the body of the rotation driving device is fixedly arranged on the tank cover, the liquid nitrogen storage box is connected to the frame body, the surface of the tank cover is provided with a transmission port corresponding to the liquid nitrogen storage box, and the transmission port is provided with a tank plug.

Further, according to the sample cooling and storage method of the present disclosure, the liquid nitrogen storage box is a rectangular box body with an opening top end, and the frame body is provided with a plurality of liquid nitrogen storage boxes around the rotating spindle.

Further, according to the sample cooling and storage method of the present disclosure, the liquid nitrogen storage box is internally provided with a basket-type sample storage rack, the basket-type sample storage rack is adapted to the liquid nitrogen storage box, the basket-type sample storage rack includes a storage rack body, the top end of the storage rack body is provided with a connector connected with the output end of the lifting device, the storage rack body is provided with several layers of storage grooves with opening front ends in sequence from top to bottom, and single-layer samples are placed in the storage grooves.

Further, according to the sample storage and storage method of the present disclosure, the origin inside the liquid nitrogen storage box is set at a position 250 millimeters below the liquid surface.

Further, according to the sample cooling and storage device of the present disclosure, the rotation driving device includes a drive motor and a reducer, an output shaft of the drive motor is connected with an input shaft of the reducer, the output shaft of the reducer is connected with the rotating spindle, the reducer is a right-angle reducer whose body is fixedly arranged on the fixing bracket on the surface of the tank cover, and the fixing bracket is fixedly arranged on the surface of the tank cover.

Further, according to the sample cooling and storage method of the present disclosure, bearings are arranged between the top end of the rotating spindle and the tank cover and between the bottom end of the rotating spindle and the bearing seat at the bottom of the tank body.

Further, according to the sample cooling and storage method of the present disclosure, the top end of the output shaft of the reducer is also connected with a turntable.

Further, according to the sample cooling and storage method of the present disclosure, the turntable is provided with a shielding sheet, one side of the reducer is provided with an upright plate, the top of the upright plate is provided with an U-shaped photoelectric switch, the bottom end of the upright plate is fixedly arranged on the fixing bracket, and the shielding sheet is capable of penetrating through a U groove of the U-shaped photoelectric switch.

Further, according to the sample cooling and storage method of the present disclosure, the frame body includes a top frame plate, a bottom frame plate and several connection vertical plates connecting the top frame plate with the bottom frame plate, and the middle of the top frame plate and the middle of the bottom frame plate are fixedly connected with the rotating spindle, respectively.

Preferably, the sample cooling and storage method of the present disclosure also includes another liquid nitrogen storage box arrangement method, specifically including arranging a plurality of the liquid nitrogen storage boxes in a sample storage apparatus, wherein the plurality of the liquid nitrogen storage boxes are divided into at least one cooling box and a plurality of sample storage boxes; and the cooling box performs programmed cooling on the samples, and the sample storage box stores the cooled samples.

Further, according to the sample cooling and storage method of the present disclosure, the cooling box performs lifting-type programmed cooling on the single-layer samples; and the sample storage box stores multi-layer samples.

Further, according to the sample cooling and storage method of the present disclosure, the cooling box and the sample storage box have the same structure and are both internally provided with basket-type sample storage racks, the basket-type sample storage rack is adapted to the liquid nitrogen storage box, the basket-type sample storage rack includes a storage rack body, the top end of the storage rack body is provided with a connector connected with the output end of the lifting device, and the storage rack body is provided with several layers of storage grooves with opening front ends from top to bottom in sequence.

Further, according to the sample cooling and storage method of the present disclosure, the sample storage apparatus includes a tank body, the top end of the tank body is provided with a tank cover, the inner cavity of the tank body is provided with a rotating frame, the rotating frame includes a frame body and a rotating spindle connected with the frame body, the bottom end of the rotating spindle is arranged on a bearing seat located in the center of the bottom of the tank body, the top end of the rotating spindle penetrates through the tank cover and is connected with an output shaft of a rotation driving device, the body of the rotation driving device is fixedly arranged on the tank cover, the liquid nitrogen storage box is connected to the frame body, the surface of the tank cover is provided with a transmission port corresponding to the liquid nitrogen storage box, and the transmission port is provided with a tank plug;

the cooling box is internally provided with liquid nitrogen and performs programmed cooling on the single-layer samples placed in the storage groove;

the sample storage box is internally not provided with liquid nitrogen, and stores the samples through the adapted basket-type sample storage rack;

the cooling box and the sample storage box are arranged on the rotating frame; the lifting device raises and lowers the basket-type sample storage racks in the cooling box and the sample storage box, respectively.

Further, according to the sample cooling and storage method of the present disclosure, the lifting device is a linear displacement actuator driven by the servo motor, the body of the linear displacement actuator is mounted on an output end of a three-dimensional movement mechanism, the three-dimensional movement mechanism is arranged in a casing above the tank body; and the output end of the linear displacement actuator is connected with a mechanical arm which is corresponding to the connector on the top of a basket-type sample storage rack;

the casing is also internally provided with a shovel tray pushing mechanism, the lifting device raises and lowers the basket-type sample storage racks in the cooling box and the sample storage box respectively into the casing; and the shovel tray pushing mechanism performs a fetching and storing operation on samples on the basket-type sample storage racks in the cooling box and the sample storage box respectively.

Further, according to the sample cooling and storage method of the present disclosure, the top end of the liquid nitrogen storage box is connected to the edge of the top frame plate through a bolt, and the edge of the top frame plate is provided with a positioning slot adapted to the liquid nitrogen storage box.

According to the sample cooling and storage method, a method of programmed cooling is divided into a method of cooling in several stages corresponding to a standard ambient cooling curve. In each stage of cooling, whether the samples are raised and lowered is determined by checking whether the actual ambient temperature $T_1$ is equal to the target ambient temperature w, so that the actual ambient temperature $T_1$ is consistent with the target ambient temperature w, until the actual ambient temperature $T_1$ is consistent with the target temperature $T_2$ in this stage of cooling. After each stage of cooling in sequence, the samples finally reach a temperature required for cryogenic storage, and are directly stored in the liquid nitrogen storage box.

Compared with the existing programmed cooling and sample storage method, the sample cooling and storage method of the present disclosure achieves the programmed cooling of the samples by raising and lowering the samples in the liquid nitrogen storage box, the samples are directly stored in the liquid nitrogen storage box after reaching the cryogenic storage temperature, the cooling and storage process of the sample only involves single programmed cooling and storage equipment, which is extremely convenient for programmed cooling and storage operations of single-layer samples.

The above descriptions are merely a summary of the technical solution of the present disclosure. To understand the technical means of the present invention more clearly and implement it specifically in accordance with the content of the specification, the present disclosure will be described in detail below with reference to embodiments of the present disclosure.

Figure 1:
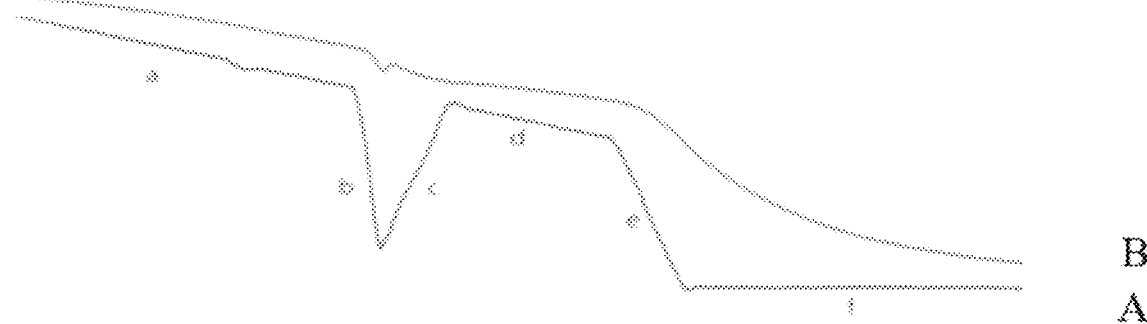
FIG. 1 is a graph showing a standard ambient cooling curve and an actual sample cooling curve.

In the figures, liquid nitrogen storage box, 1; tank body, 2; tank cover, 3; frame body, 4; rotating spindle, 5; bearing seat, 6; transmission port, 7; tank plug, 8; storage rack body, 9; connector, 10; storage groove, 11; drive motor, 12; reducer, 13; fixing bracket, 14; turntable, 15, shielding sheet, 16; upright plate, 17; U-shaped photoelectric switch, 18; top frame plate, 19; bottom frame plate, 20; connection vertical plate, 21; positioning slot, 22; casing, 23; cooling box 101; and sample storage box, 102

DETAILED DESCRIPTION OF THE EMBODIMENTS

Next, specific implementation modes of the present disclosure will be further described in details with reference to drawings and embodiments. The following embodiments are used for illustrating the present disclosure, but not limiting the scope of the present disclosure.

Referring to FIG. 1-FIG. 14, a sample cooling and storage method in this example includes a step of placing samples into a liquid nitrogen storage box, wherein in the sample cooling and storage method, the samples are raised and lowered in the liquid nitrogen storage box via a lifting device, subjected to programmed cooling and then directly stored in the liquid nitrogen storage box after the programmed cooling, and a method of programmed cooling includes the following steps:

dividing programmed cooling into several stages of cooling which correspond to a standard ambient cooling curve and are performed in sequence, wherein each stage of cooling the following steps:

S1: setting a target ambient temperature w according to the standard ambient cooling curve;

S2: acquiring an actual ambient temperature $T_1$; and

S3: comparing the target ambient temperature w with the actual ambient temperature $T_1$ and controlling the raising and lowering of samples;

lowering the samples by a predetermined height if the target ambient temperature w is higher than the actual ambient temperature $T_1$;

raising the samples by a predetermined height if the target ambient temperature w is lower than the actual ambient temperature $T_1$;

determining whether the actual ambient temperature $T_1$ is equal to a target temperature $T_2$ in this stage of cooling if the target ambient temperature w is equal to the actual ambient temperature $T_1$;

ending this stage of cooling if the actual ambient temperature $T_1$ is equal to the target temperature $T_2$ in this stage of cooling at the moment; and cyclically performing step S1 to step S3 if the actual ambient temperature $T_1$ is not equal to the target temperature $T_2$ in this stage of cooling at the moment, until the actual ambient temperature $T_1$ is equal to the target temperature $T_2$ in this stage of cooling.

According to the sample cooling and storage method of the present disclosure, the method of programmed cooling is divided into the method of cooling in several stages corresponding to a standard ambient cooling curve. In each stage of cooling, whether samples need to be raised or lowered is determined by checking whether the actual ambient temperature $T_1$ is equal to a target ambient temperature w, so that the actual ambient temperature $T_1$ is consistent with the target ambient temperature w, until the actual ambient temperature $T_1$ is consistent with a target temperature $T_2$ for this stage of cooling. After each stage of cooling in sequence, the samples finally reach a temperature required for cryogenic storage, and are directly stored in the liquid nitrogen storage box.

Compared with the existing programmed cooling and sample storage method, the sample cooling and storage method of the present disclosure achieves the programmed cooling of the samples by raising and lowering the samples in the liquid nitrogen storage box, the samples are directly stored in the liquid nitrogen storage box after reaching the cryogenic storage temperature, the cooling and storage process of the samples only involves single programmed cooling and storage equipment, which is extremely convenient for programmed cooling and storage operations of single-layer samples.

The liquid nitrogen storage box is used for storing liquid nitrogen, which can be an independent liquid nitrogen storage device, or arranged in the sample storage apparatus.

In this example, the liquid nitrogen storage box 1 is a rectangular box body with an opening top end, which is arranged in the sample storage apparatus. The sample storage apparatus includes a tank body 2, the top end of the tank body is provided with a tank cover 3, the inner cavity of the tank body is provided with a rotating frame, the rotating frame includes a frame body 4 and a rotating spindle 5 connected with the frame body, the bottom end of the rotating spindle is arranged on a bearing seat 6 located in the center of the bottom of the tank body, the top end of the rotating spindle penetrates through the tank cover and is connected with an output shaft of a rotation driving device, the body of the rotation driving device is fixedly arranged on the tank cover, the liquid nitrogen storage box is connected to the frame body, the surface of the tank cover is provided with a transmission port 7 corresponding to the liquid nitrogen storage box, and the transmission port is provided with a tank plug 8.

When in specific implementation, the frame body is provided with a plurality of liquid nitrogen storage boxes around the rotating spindle, and the rotating spindle, driven by the rotation driving device, drives the rotating frame to rotate, so that a corresponding liquid nitrogen storage box rotates directly below the transmission port for the subsequent operation of the samples by the lifting device.

To improve the thermal insulation effect, the tank body is a double-layer tank body, liquid nitrogen is stored in the tank body, and the liquid nitrogen in the tank body enters the liquid nitrogen storage box through a corresponding channel. The liquid nitrogen storage box has a smaller cross section than the tank body, which ensures that the temperature of the liquid nitrogen inside the liquid nitrogen storage box at the same level is almost uniform. However, the tank body itself has significant temperature difference at different positions at the same level due to its large volume, and therefore it is not suitable for programmed cooling.

For the ease of raising and lowering the single-layer samples, the liquid nitrogen storage box is internally provided with a basket-type sample storage rack, the basket-type sample storage rack is adapted to the liquid nitrogen storage box, the basket-type sample storage rack includes a storage rack body 9, the top end of the storage rack body is provided with a connector 10 connected with the output end of the lifting device, the storage rack body is provided with several layers of storage grooves 11 with opening front ends in sequence from top to bottom, and single-layer samples are placed in the storage grooves.

Figure 2:
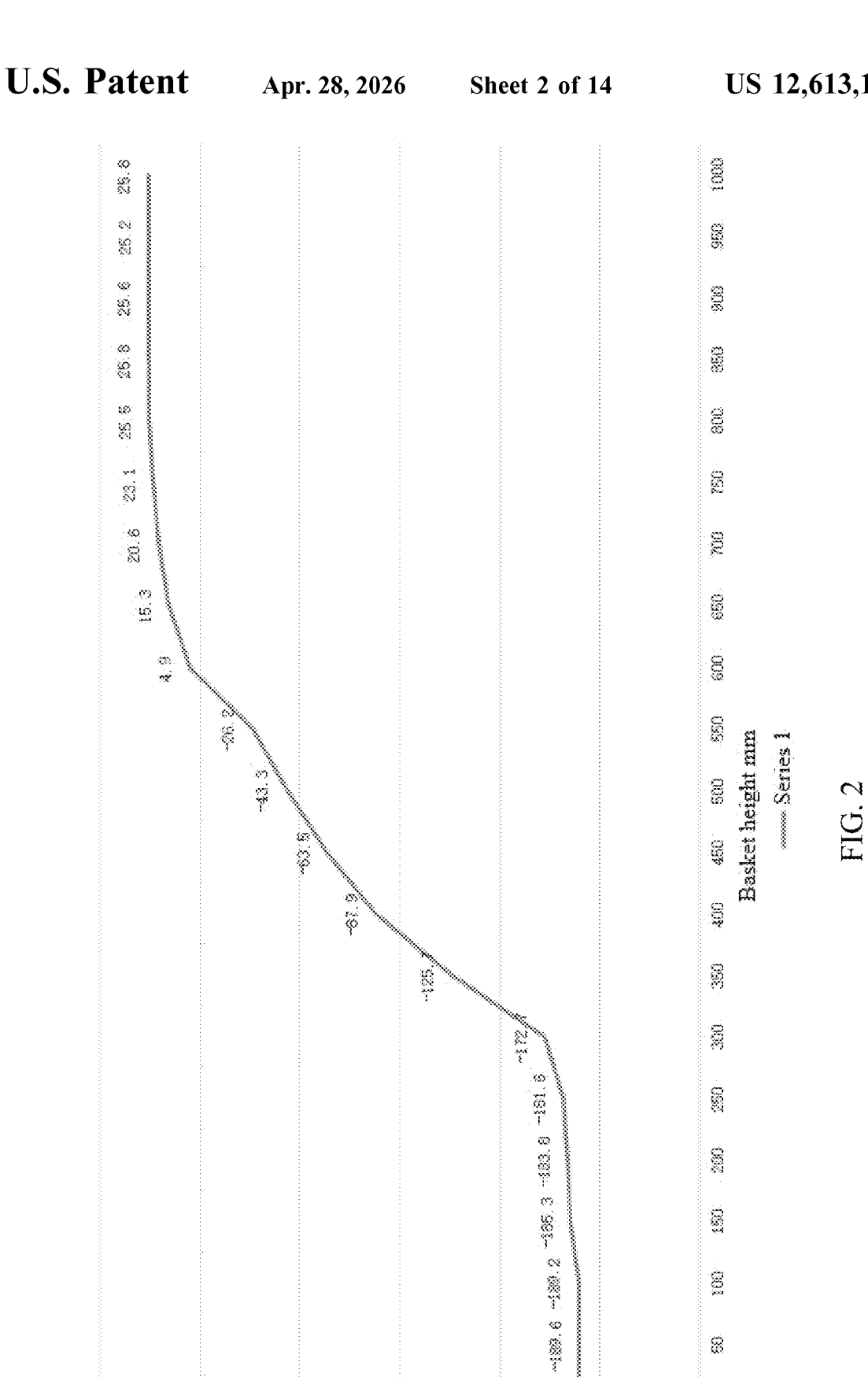
FIG. 2 is an ambient temperature curve graph from an origin to a 600 millimeter position in a liquid nitrogen storage box.
Figure 3:
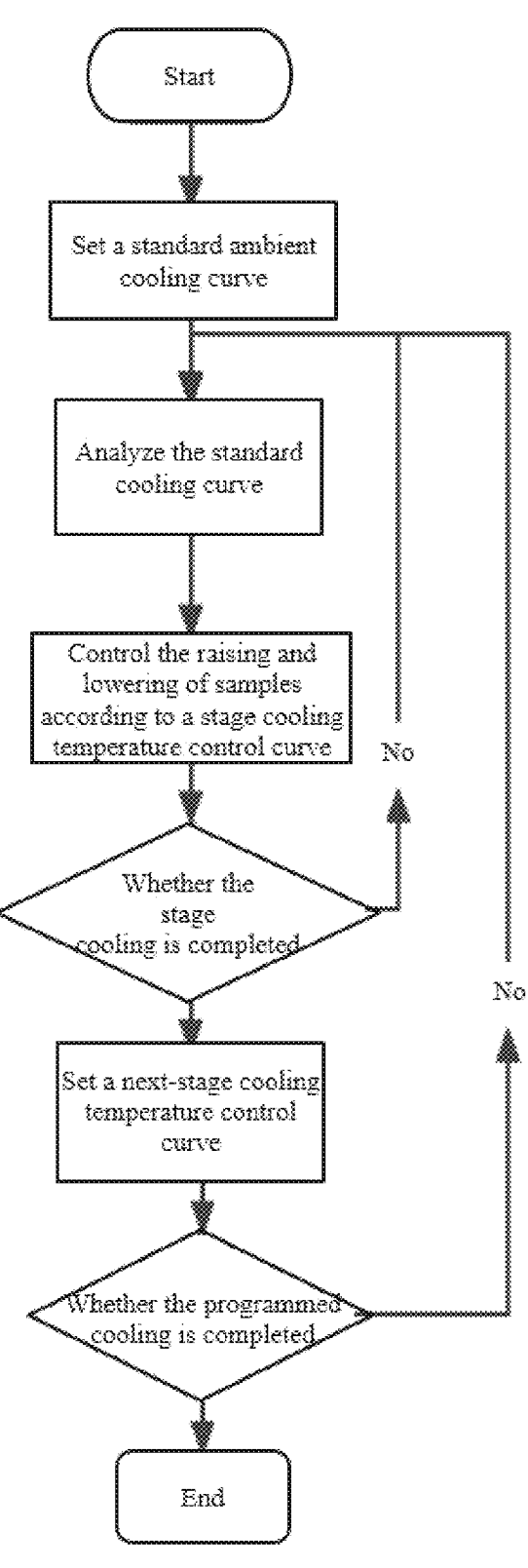
FIG. 3 is a general programmed cooling flowchart of samples.
Figure 4:
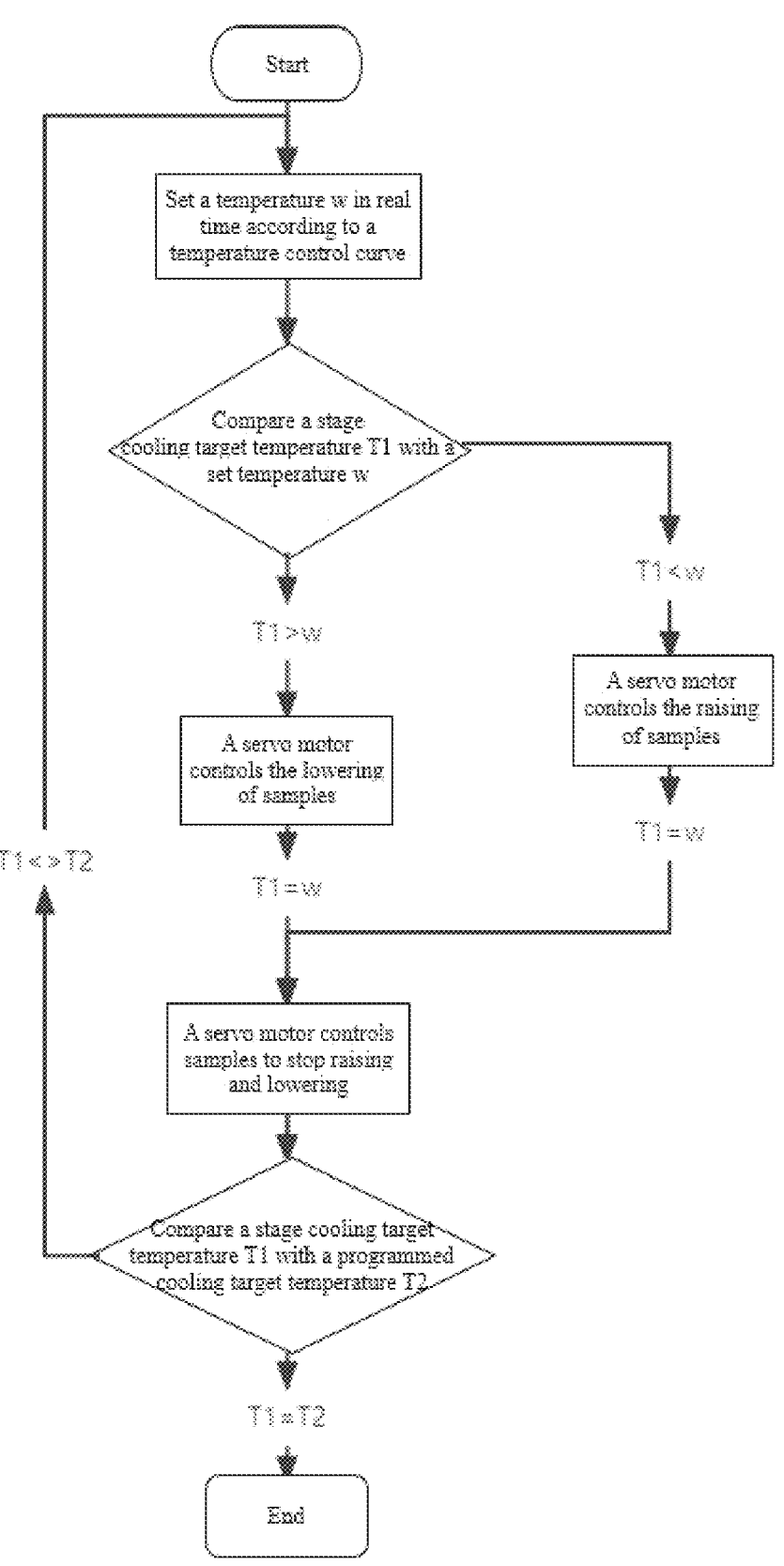
FIG. 4 is a stage cooling flowchart of samples.
Figure 5:
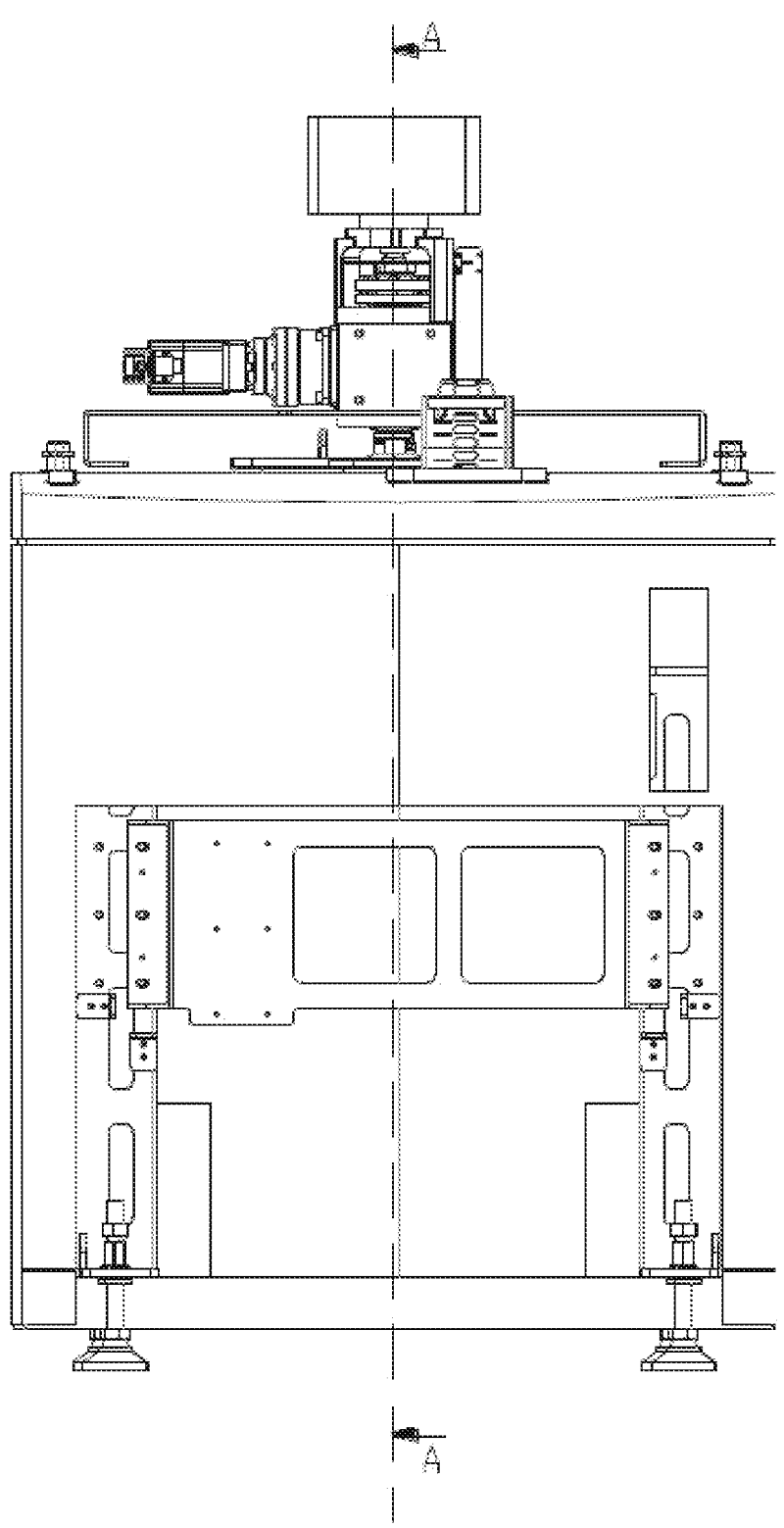
FIG. 5 is a front view of a sample storage apparatus.
Figure 6:
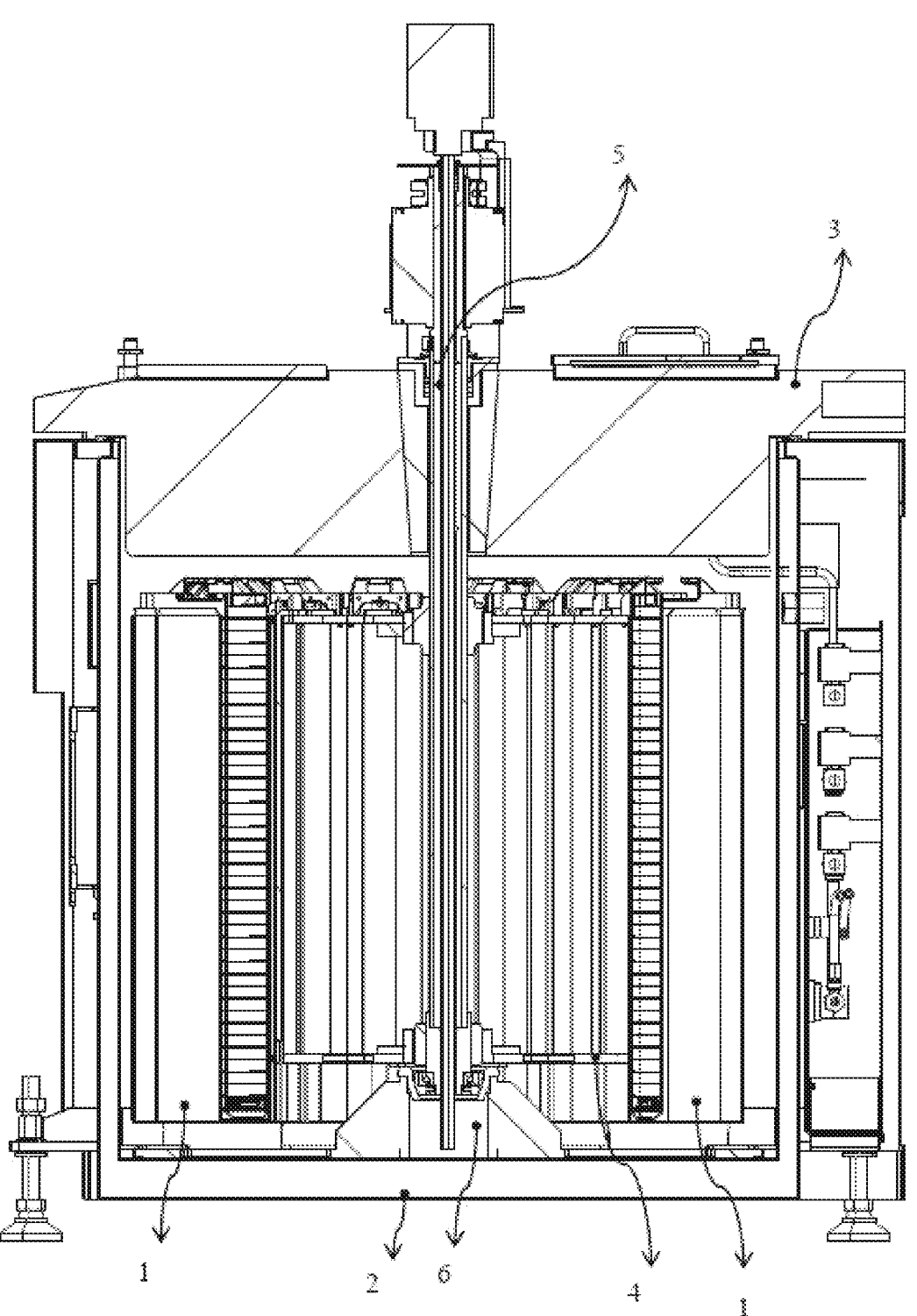
FIG. 6 is a sectional view of a sample storage apparatus.
Figure 7:
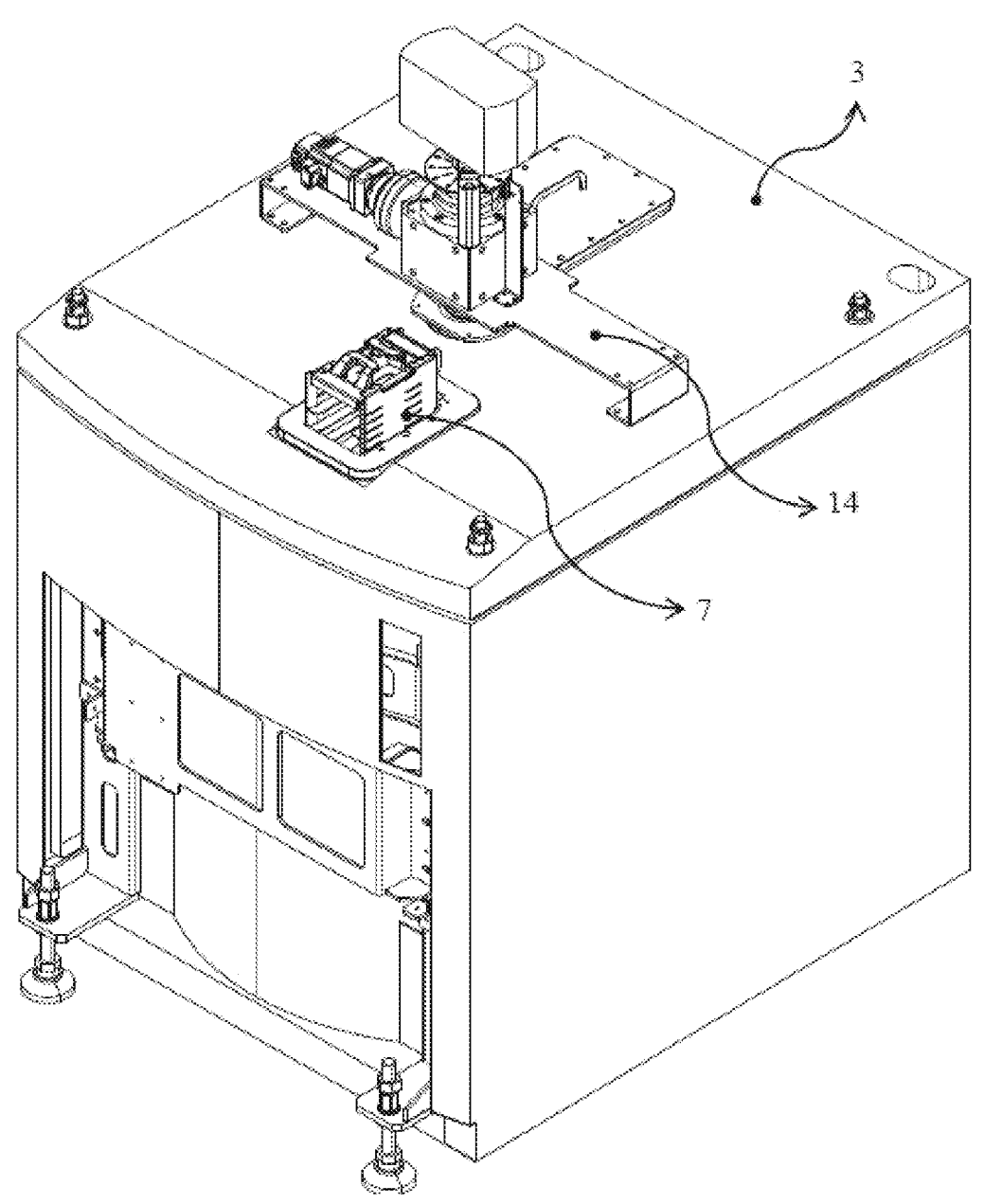
FIG. 7 is a perspective view of a sample storage apparatus.
Figure 8:
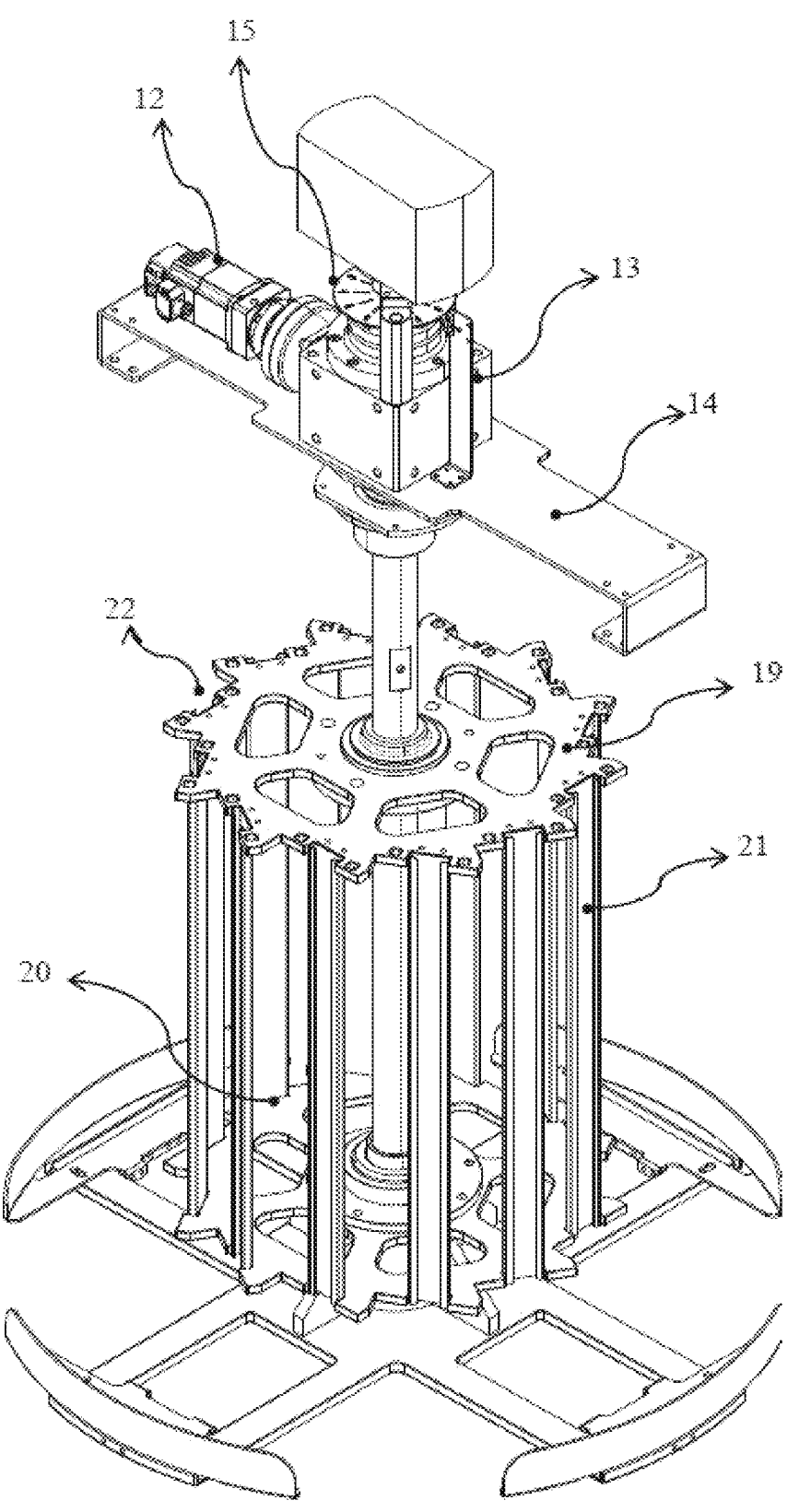
FIG. 8 is a connection graph of a rotating frame and a rotation driving device.
Figure 9:
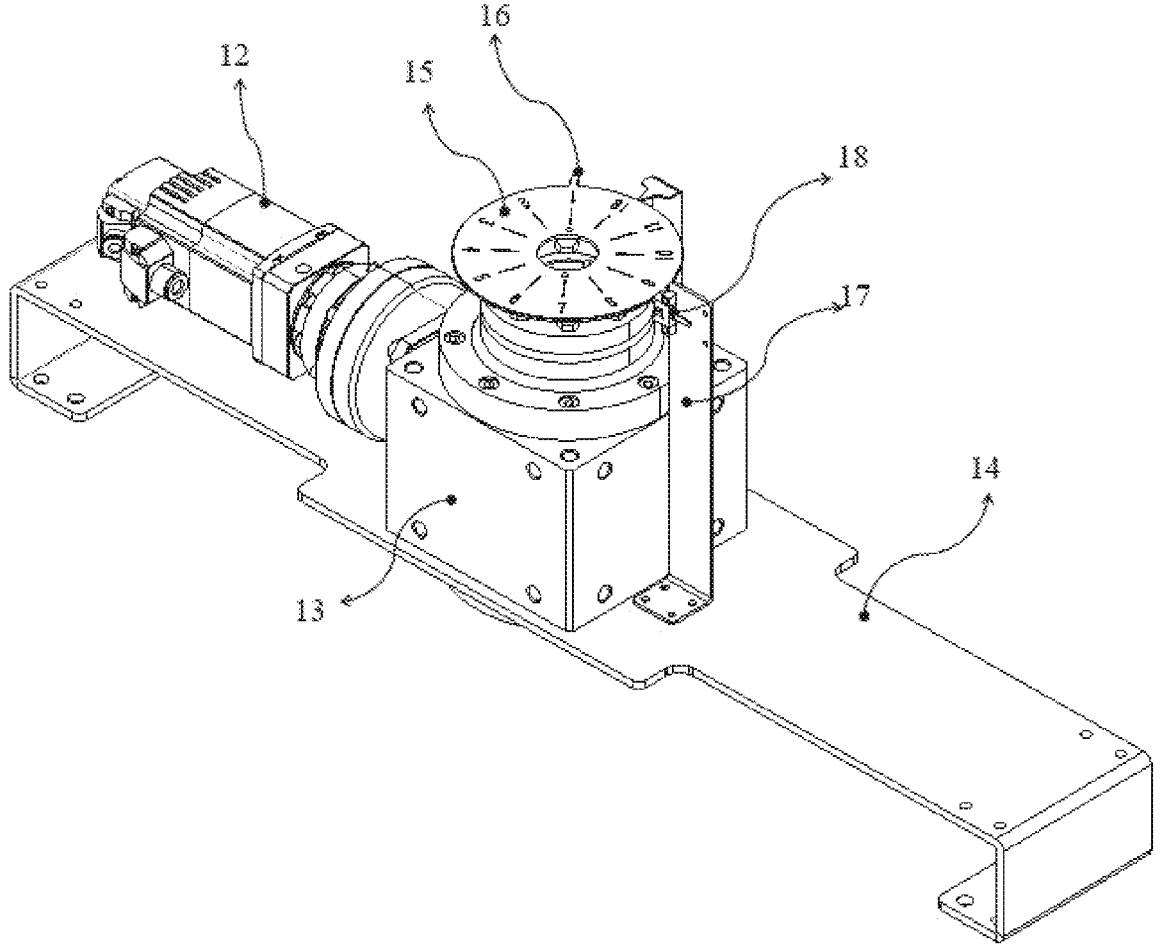
FIG. 9 is a perspective view of a rotation driving device.
Figure 10:
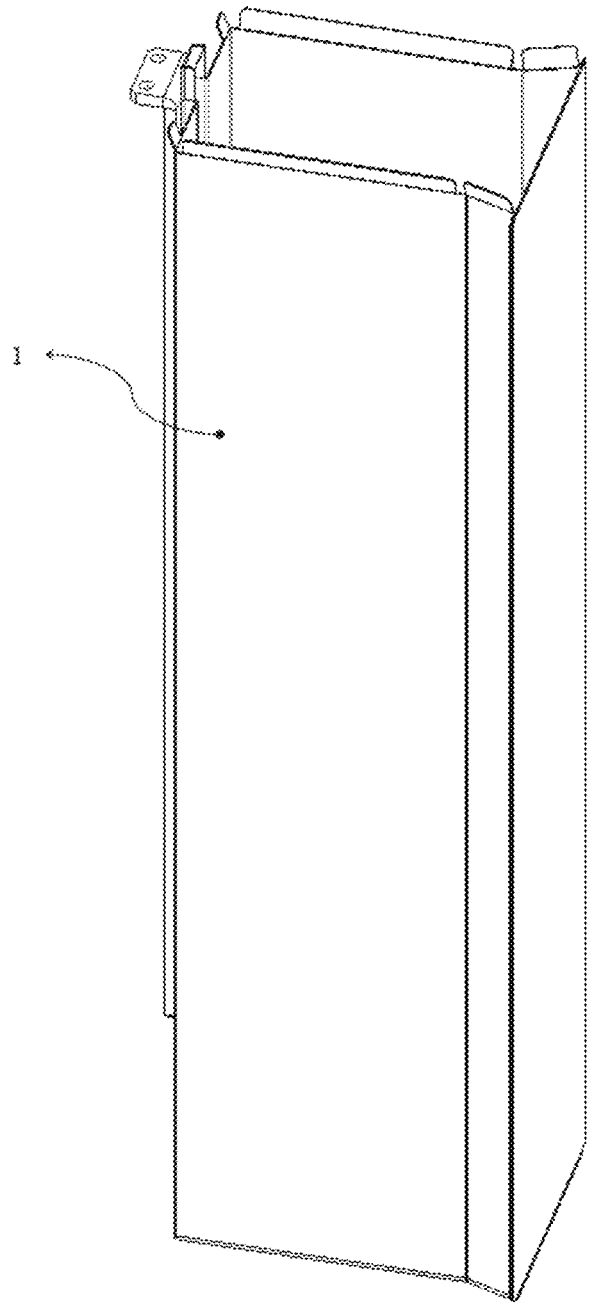
FIG. 10 is a perspective view of a liquid nitrogen storage box.
Figure 11:
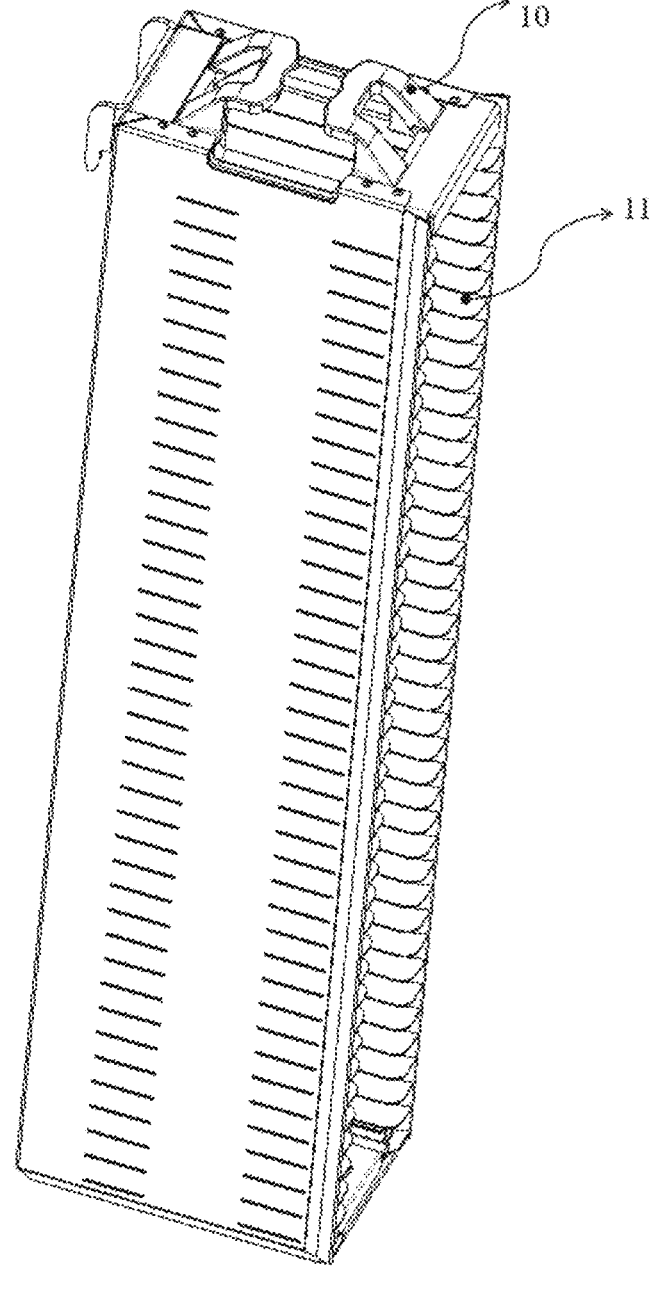
FIG. 11 is a perspective view of a basket-type sample storage rack.
Figure 12:
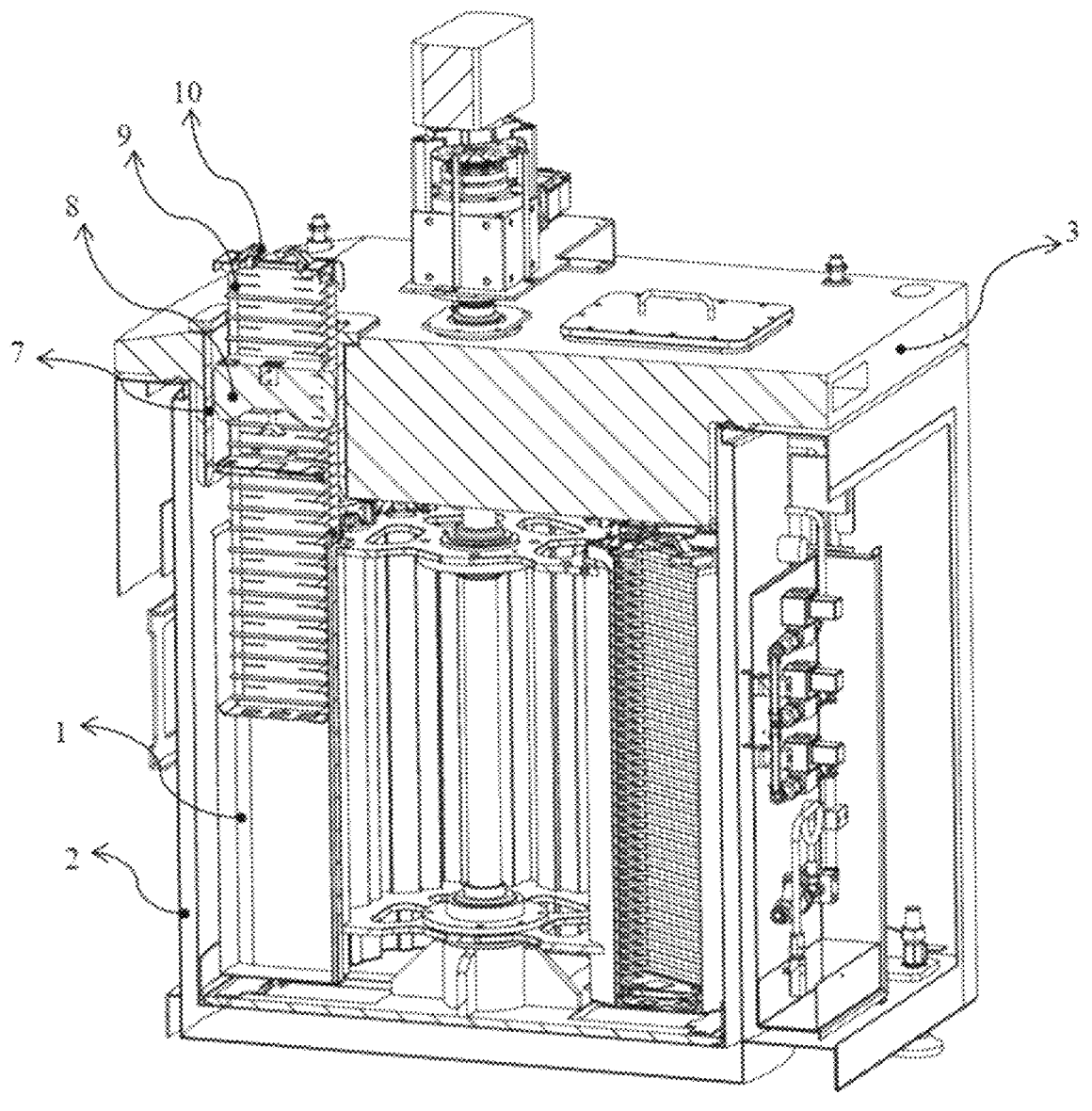
FIG. 12 is another sectional view of a sample storage apparatus.
Figure 13:
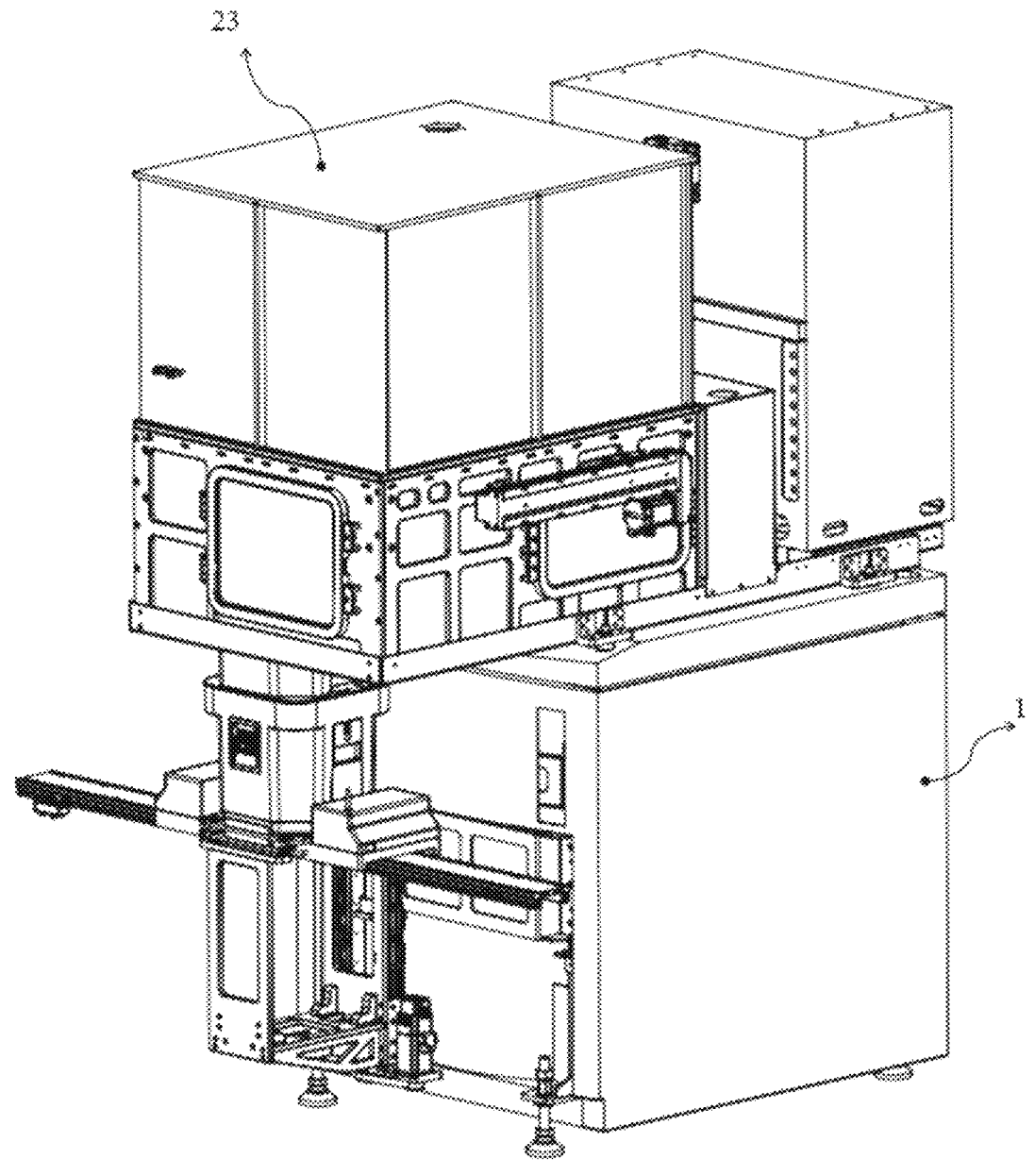
FIG. 13 is a connection graph of a sample storage apparatus and a casing.
Figure 14:
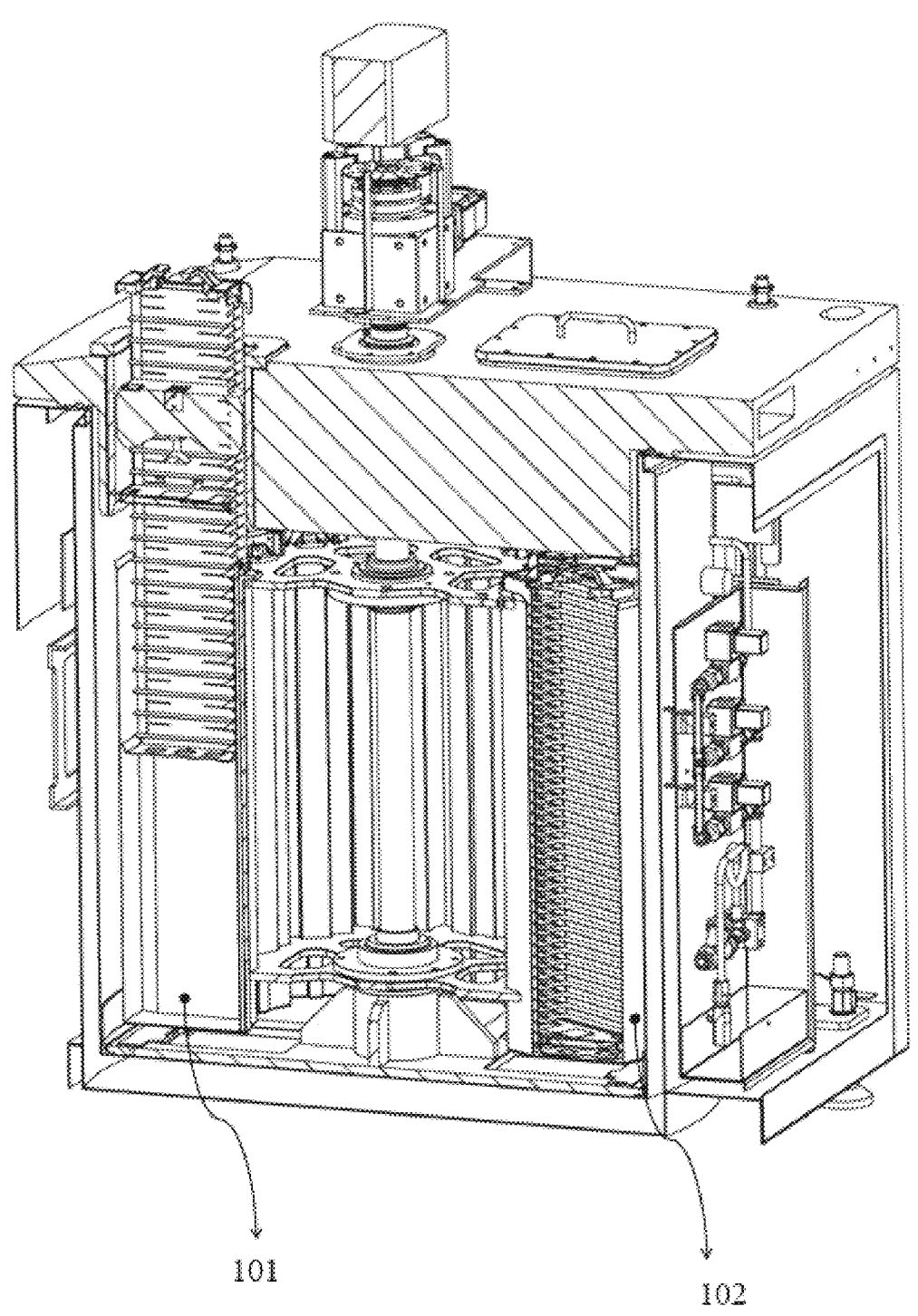
FIG. 14 is another sectional view of a sample storage apparatus.

In this example, the origin inside the liquid nitrogen storage box is set at a position 250 millimeters below the liquid surface. FIG. 2 shows an ambient temperature curve from the origin to the 600-millimeter position. As can be seen from the figure, starting from the origin to a 250 mm position, the ambient temperature slightly changes, is basically less than −180° C., and when the position changes from 250 mm to 600 mm, the ambient temperature rises from −180° C. to 5° C. The 600 mm position is located at the outlet end of the transmission port. When the basket-type sample storage rack is lowered to the lowest position, the 22nd-layer storage groove on the basket-type sample storage rack is located at the origin.

Where, the rotation driving device is used to drive the rotating spindle to rotate, which in turn drives the frame body and the liquid nitrogen storage box on the frame body to rotate, so that the corresponding liquid nitrogen storage box rotates directly below the transmission port, thereby allowing the lifting device to operate the basket-type sample storage rack and samples on the basket-type sample storage rack.

In this example, the rotation driving device includes a drive motor 12 and a reducer 13, an output shaft of the drive motor is connected with an input shaft of the reducer, the output shaft of the reducer is connected with the rotating spindle, the reducer is a right-angle reducer whose body is fixedly arranged on the fixing bracket 14 on the surface of the tank cover, and the fixing bracket is fixedly arranged on the surface of the tank cover.

During the working, the output shaft of the drive motor drives a gear motor to rotate, so as to drive the rotating spindle at the output end of the reducer to rotate.

Bearings are arranged between the top end of the rotating spindle and the tank cover and between the bottom end of the rotating spindle and the bearing seat at the bottom of the tank body to reduce friction.

The top end of the output shaft of the reducer is also connected with a turntable 15, the surface of the turntable is provided with scales to facilitate an operator to observe a position where the rotating frame is located.

To achieve the positioning limit of the rotating frame, the turntable is provided with a shielding sheet 16, one side of the reducer is provided with an upright plate 17, the top of the upright plate is provided with an U-shaped photoelectric switch 18, the bottom end of the upright plate is fixedly arranged on the fixing bracket, and the shielding sheet is capable of penetrating through a U groove of the U-shaped photoelectric switch.

The positioning limit of the rotating frame is achieved by arranging the U-shaped photoelectric switch and the shielding sheet. Specifically, the turntable rotates under the drive of the output shaft of the reducer and then drives the shielding sheet on the turntable to rotate. When the shielding sheet rotates to the U groove of the U-shaped photoelectric switch, and the light path of the U-shaped photoelectric switch is shielded, so as to generate a corresponding pulse signal. An external control circuit controls the drive motor and the reducer to stop rotation according to the pulse signal and gives out corresponding warning information to remind the operator.

Preferably, the frame body includes a top frame plate 19, a bottom frame plate 20 and several connection vertical plates 21 connecting the top frame plate with the bottom frame plate, and the middle of the top frame plate and the middle of the bottom frame plate are fixedly connected with the rotating spindle, respectively, and the top frame plate and the bottom frame plate are both provided with several hollowed-out holes to reduce their weights. The top end of the liquid nitrogen storage box is connected to the edge of the top frame plate through a bolt, and the edge of the top frame plate is provided with a positioning slot 22 adapted to the liquid nitrogen storage box to achieve the positioning of the liquid nitrogen storage box.

The lifting device is used for driving the raising and lowering of the samples in the liquid nitrogen storage box, and achieving the programmed cooling and storage of the samples through corresponding control programs.

In this example, the lifting device is a linear displacement actuator driven by a servo motor, the body of the linear displacement actuator is mounted on an output end of a three-dimensional movement mechanism, the three-dimensional movement mechanism is arranged in a casing 23 above the tank body. The output end of the linear displacement actuator is connected with a mechanical arm which is corresponding to the connector on the top of a basket-type sample storage rack.

During the working, the three-dimensional movement mechanism makes the lifting device move above the transmission port, subsequently the linear displacement actuator, driven by the servo motor, drives the lowering of the mechanical arm and the basket-type sample storage rack connected thereto, after that, an external controller cools and stores the samples according to the above-mentioned method of programmed cooling, and each component resets for next working after storage is completed.

In this example, the liquid nitrogen storage box can also be arranged in another implementation mode. The implementation mode includes a step of placing the samples into the liquid nitrogen storage box. In the sample cooling and storage method, the samples are raised and lowered in the liquid nitrogen storage box through the lifting device, then subjected to programmed cooling and subsequently directly stored in the liquid nitrogen storage box after the programmed cooling. A plurality of liquid nitrogen storage boxes 1 are arranged in the sample storage apparatus, the plurality of liquid nitrogen storage boxes are divided into at least one cooling box 101 and a plurality of sample storage boxes 102; a program for sample cooling is carried out in the cooling box 101, the cooling box 101 is internally provided with liquid nitrogen, the tank body 2 is a double-layer tank body, liquid nitrogen is stored in the tank body, the liquid nitrogen in the tank body enters the cooling box 101 through the corresponding channel, and the cooling box 101 has a smaller cross section than the tank body, which ensures that the temperature of the liquid nitrogen inside the liquid nitrogen storage box at the same level is almost uniform; according to the above-mentioned method, the cooling box 101 performs programmed cooling on the samples, then the cooled samples are transferred to the sample storage box 102 for sample storage after the target temperature is reached. In this way, a stable cooling area is formed in the cooling box 101 to gradually cool the samples; a plurality of sample storage boxes 102 form a plurality of storage unit areas; since there are no liquid nitrogen in the sample storage box 102, the sample storage box 102 is isolated from the liquid nitrogen in the tank body 2, which ensures that the samples stored in the sample storage box 102 do not directly come into contact with the liquid nitrogen in the tank body 2, thus avoiding the cross contamination of the samples.

Preferably, single-layer samples can be frozen in the cooling box 101 by arranging one cooling box 101 and a plurality of sample storage boxes 102, and the frozen single-layer samples can be stored in the sample storage boxes 102. The cooling box 101 can perform lifting-type programmed cooling on the single-layer samples; and the sample storage boxes 102 can store multi-layer samples. Furthermore, the cooling box 101 and the sample storage boxes 102 are internally provided with basket-type sample storage racks, the basket-type sample storage rack is adapted to the liquid nitrogen storage box, the basket-type sample storage rack includes a storage rack body, the top end of the storage rack body is provided with a connector connected with the output end of the lifting device, and the storage rack body is provided with several layers of storage grooves with opening front ends from top to bottom in sequence.

When target single-layer samples need to be cooled, target samples are placed in the storage rack body 9 for programmed cooling carried out in the above-mentioned step; and then the samples subjected to programmed cooling are stored in the sample storage box 102, and the storage rack body in the sample storage box 102 can store multi-layer samples.

Here, it is noted that the basket-type sample storage rack can perform raising and lowering in the cooling box 101 and the sample storage box 102.

Preferably, samples are placed on any of several layers of storage grooves on the storage rack body in the cooling box 101, wherein the samples are placed on only one layer, except the rest layers, the raising and lowering of the single-layer samples is driven by utilizing the storage rack body to come into contact with liquid nitrogen in the cooling box 101, thereby performing programmed cooling.

Preferably, each layer of storage groove on the storage rack body in the sample storage box 102 can store samples; the cooled single-layer samples in the cooling box 101 can be stored in the storage groove of the sample storage box 102, until multi-layer storage grooves of the sample storage box 102 have been filled and stored.

Preferably, the liquid nitrogen in the tank body can be isolated through the cooling box 101 and the sample storage box 102, avoiding the cross contamination of the samples.

The cooling box 101 and the sample storage box 102 are arranged in the rotating frame; and the lifting device can raise and lower the basket-type sample storage rack in the cooling box 101 and the sample storage box 102 respectively.

It should be noted that, the rotating frame, driven by the rotation driving device, can drive the cooling box 101 and the sample storage box 102 to rotate, which in turn matches with the transmission port above; the basket-type sample storage rack is raised into the casing through the transmission port by utilizing the lifting device; the cooled samples are shoveled by utilizing the shovel tray pushing mechanism, and then the basket-type sample storage rack in the sample storage box 102 is raised into the casing by using the lifting device; the cooled samples are pushed into the basket-type sample storage rack on the sample storage box 102 by utilizing the shovel tray pushing mechanism, then the basket-type sample storage rack is pushed back to the sample storage box 102 by utilizing the lifting device to achieve storage, so as to complete the cyclic operation, thereby achieving that the cooled single-layer samples in the cooling box 101 are pushed onto the basket-type sample storage rack in the sample storage box 102 in sequence and realizing that multi-layer samples are stored on the basket-type sample storage rack in the sample storage box 102.

Preferably, the lifting device is a linear displacement actuator driven by the servo motor, the body of the linear displacement actuator is mounted on an output end of a three-dimensional movement mechanism, the three-dimensional movement mechanism is arranged in a casing above the tank body; and the output end of the linear displacement actuator is connected with a mechanical arm which is corresponding to the connector on the top of a basket-type sample storage rack;

the casing is also internally provided with the shovel tray pushing mechanism, the lifting device raises and lowers the basket-type sample storage racks in the cooling box 101 and the sample storage box 102 respectively into the casing; and the shovel tray pushing mechanism performs a fetching and storing operation on samples on the basket-type sample storage racks in the cooling box 101 and the sample storage box 102 respectively.

Preferably, the rotation driving device can drive the rotating spindle to rotate, so as to drive the rotating frame to rotate, the rotating frame drives the cooling box 101 and the sample storage box 102 to rotate, the basket-type sample storage rack in the cooling box 101 or the sample storage box 102 is raised and lowered through the transmission port by utilizing the lifting device, thereby achieving programmed cooling or sample storage.

Preferably, in this example, no multiple dedicated cooling devices are required; only one cooling box 101 is needed to perform programmed cooling on single-layer samples. This operation is simple and convenient, improving the processing speed of single-layer samples.

In this example, according to the standard ambient cooling curve, programmed cooling is divided into five stages of cooling, which respectively correspond to five nearly straight cooling segments a, b, c, d and e in curve A of FIG. 1. The temperature control equation for each stage of cooling is as follows:

$$w = Kx + b;$$

wherein, w is a set target ambient temperature, x is cooling time, k is a cooling rate, b is a temperature of a starting point in this curve segment.

For setting the target ambient temperature w according to the standard ambient cooling curve in real time in step S1, the standard ambient cooling curve is a stage cooling curve corresponding to this stage of cooling, and corresponds to the above-mentioned temperature control equation. "Real time" here refers to a short interval of time, for example 1 second, which is specifically determined based on the precision of the system.

For acquiring the actual ambient temperature $T_1$ in step S2, the actual ambient temperature $T_1$ of the environment where the sample is located can be acquired by arranging a temperature sensor at a position where the single-layer sample on the basket-type sample storage rack is located.

In step S3, the predetermined raising and lowering height of the sample can be a manually set fixed height, for example 1 cm, or automatically set by the system according to temperature gradient, so that the sample can reach the actual ambient temperature as soon as possible.

In step S3, the target temperature $T_2$ of stage cooling refers to the end-point temperature of the stage cooling segment corresponding to each stage of cooling on the standard ambient cooling curve.

In each stage of cooling, a programmable logic controller controls the output of the servo motor through a proportional-integral-derivative (PID) algorithm, and the operational regulation equation of the PID algorithm is as follows:

$$\Delta y = K_p \cdot s \cdot \left[ (b \cdot w - x) + \frac{1}{K_i \cdot s}(w - x) + \frac{K_d \cdot s}{a \cdot K_d \cdot s + 1}(c \cdot w - x) \right];$$

12 wherein, $\Delta y$ is an output value of the PID algorithm; $K_P$ is a proportional grain, s is a Laplacian operator, b is a proportional action weight, w is a set target ambient temperature, x is an actual ambient temperature where a sample is located, $K_i$ is integral action time, a is a derivative delay coefficient, $K_d$ is derivative action time, and c is a derivative action weight;

wherein, specific values of $K_P$, b, $K_i$, a, $K_d$ and c are manually or automatically set by the system based on the precision and stability requirements.

Through the PID algorithm, the output of the servo motor is controlled, and then the raising and lowering of the basket-type sample storage rack and the samples are controlled through the lifting device so as to achieve the precise raising and lowering of the samples, thereby completing programmed cooling.

In the PID algorithm, P represents a proportional controller, I represents an integral controller, and D represents a derivative controller; in the proportional controller, the control law is the output signal u of the controller is proportional to the deviation e (deviation e=set value w−process value x), and its equation is as follows:

$$\mu = K_P e = K_P(w - x)$$

In the derivative controller, the control law is the output signal $\mu$ of the controller is proportional to the deviation e (deviation e=set value w−process value x), and its equation is as follows:

$$\mu = K_i \int_0^t e \, dt = K_i \int_0^t (w - x) \, dt$$

In derivative control, the control law is that the deviation e is subjected to the derivative action of the controller to obtain the output signal u of the derivative controller, i.e., the output u of the controller is proportional to the change rate $$\frac{de}{dt}$$

of the deviation, and its equation is as follows:

$$\mu = K_d \cdot \frac{de}{dt} = K_d \cdot \frac{d(w - x)}{dt}$$

Proportional, integral and derivative controllers each have their own advantages and disadvantages. In the temperature control system for basket-type programmed cooling, an expected effect can be achieved by combining the three controllers, but not only using any one of them, i.e., the output of the signal is controlled as $\mu$=P+I+D, and relevant parameters such as $K_P$, $K_i$ and $K_d$ are reasonably optimized. Finally, the equation of the PID controller is as follows:

$$\mu = K_P e + K_i \int_0^t e \, dt + K_d \frac{de}{dt};$$

-continued $$i.e., \mu = K_P(w - x) + K_i \int_0^t (w - x)\, dt + K_d \frac{d\,(w - x)}{dt}.$$

Through differentiation and limit operations on the above formula, the PID operational regulation equation is obtained as follows:

$$\Delta y = K_p \cdot s \cdot \left[ (b \cdot w - x) + \frac{1}{K_i \cdot s}(w - x) + \frac{K_d \cdot s}{a \cdot K_d \cdot s + 1}(c \cdot w - x) \right].$$

The above-mentioned descriptions are merely preferred embodiments of the present disclosure and used for helping those skilled in the art to achieve corresponding technical solutions, but not limiting the protective scope of the present disclosure. The protective scope of the present disclosure is defined by appended claims. It should be noted that persons of ordinary skill in the art can make several equivalent modifications and variations on the basis of the technical solution of the present disclosure, and these modifications and variations should also be deemed as the protective scope of the present disclosure. Meanwhile, it should be understood that although the specification is described according to the above embodiments, but not every embodiments only contains one independent technical solution. The description mode of the specification is merely for the sake of clarity, those skilled in the art shall understand the specification as a whole, and the technical solution of each embodiment can also be appropriately combined to form other embodiments that are understandable to those skilled in the art.

What is claimed is:

1. A sample cooling and storage method, comprising a step of placing samples into a liquid nitrogen storage box, wherein in the sample cooling and storage method, the samples are raised and lowered in the liquid nitrogen storage box via a lifting device, undergo programmed cooling and then directly stored in the liquid nitrogen storage box after the programmed cooling, and a method of the programmed cooling comprises the following steps:

dividing the programmed cooling into several stages of cooling which correspond to a standard ambient cooling curve and are performed in sequence, wherein each stage of cooling comprises the following steps:

S1: setting a target ambient temperature w according to the standard ambient cooling curve;

S2: acquiring an actual ambient temperature $T_1$; and

S3: comparing the target ambient temperature w with the actual ambient temperature $T_1$ and controlling raising and lowering of the samples;

lowering the samples by a first predetermined height if the target ambient temperature w is higher than the actual ambient temperature $T_1$;

raising the samples by a second predetermined height if the target ambient temperature w is lower than the actual ambient temperature $T_1$;

determining whether the actual ambient temperature $T_1$ is equal to a target temperature $T_2$ in this stage of cooling if the target ambient temperature w is equal to the actual ambient temperature $T_1$;

ending this stage of cooling if the actual ambient temperature $T_1$ is equal to the target temperature $T_2$ in this stage of cooling at the moment; and cyclically performing step S1 to step S3 if the actual ambient temperature $T_1$ is not equal to the target temperature $T_2$ in this stage of cooling at the moment, until the actual ambient temperature $T_1$ is equal to the target temperature $T_2$ in this stage of cooling.

2. The sample cooling and storage method according to claim 1, wherein in each stage of cooling, a programmable logic controller controls output of a servo motor through a proportional-integral-derivative (PID) algorithm, and an operational regulation equation for the PID algorithm is as follows:

$$\Delta y = K_p \cdot s \cdot \left[ (b \cdot w - x) + \frac{1}{K_i \cdot s}(w - x) + \frac{K_d \cdot s}{a \cdot K_d \cdot s + 1}(c \cdot w - x) \right]$$

wherein $\Delta y$ is an output value of the PID algorithm; $K_P$ is a proportional grain, s is a Laplacian operator, b is a proportional action weight, w is a set target ambient temperature, x is an actual ambient temperature where a sample is located, $K_i$ is integral action time, a is a derivative delay coefficient, $K_d$ is derivative action time, and c is a derivative action weight.

3. The sample cooling and storage method according to claim 1, wherein the lifting device is a linear displacement actuator driven by a servo motor.

4. The sample cooling and storage method according to claim 3, wherein the liquid nitrogen storage box is arranged in a sample storage apparatus, the sample storage apparatus comprises a tank body, a top end of the tank body is provided with a tank cover, an inner cavity of the tank body is provided with a rotating frame, the rotating frame comprises a frame body and a rotating spindle connected with the frame body, a bottom end of the rotating spindle is arranged on a bearing seat located in a center of a bottom of the tank body, a top end of the rotating spindle penetrates through the tank cover and is connected with an output shaft of a rotation driving device, a body of the rotation driving device is fixedly arranged on the tank cover, the liquid nitrogen storage box is connected to the frame body, a surface of the tank cover is provided with a transmission port corresponding to the liquid nitrogen storage box, and the transmission port is provided with a tank plug.

5. The sample cooling and storage method according to claim 4, wherein the liquid nitrogen storage box is a rectangular box body with an opening top end, and the frame body is provided with a plurality of liquid nitrogen storage boxes around the rotating spindle.

6. The sample cooling and storage method according to claim 4, wherein the liquid nitrogen storage box is internally provided with a basket-type sample storage rack, the basket-type sample storage rack is adapted to the liquid nitrogen storage box, the basket-type sample storage rack comprises a storage rack body, a top end of the storage rack body is provided with a connector connected with an output end of the lifting device, the storage rack body is provided with a plurality of layers of storage grooves with opening front ends in sequence from top to bottom, and single-layer samples are placed in the storage grooves.

7. The sample cooling and storage method according to claim 4, wherein an origin inside the liquid nitrogen storage box is set at a position 250 millimeters below a liquid surface.

8. The sample cooling and storage method according to claim 4, wherein the rotation driving device comprises a drive motor and a reducer, an output shaft of the drive motor is connected with an input shaft of the reducer, an output shaft of the reducer is connected with the rotating spindle, the reducer is a right-angle reducer, a body of the reducer is fixedly arranged on a fixing bracket on the surface of the tank cover, and the fixing bracket is fixedly arranged on the surface of the tank cover.

9. The sample cooling and storage method according to claim 8, wherein bearings are arranged between the top end of the rotating spindle and the tank cover and between the bottom end of the rotating spindle and the bearing seat at the bottom of the tank body.

10. The sample cooling and storage method according to claim 8, wherein a top end of the output shaft of the reducer is also connected with a turntable.

11. The sample cooling and storage method according to claim 10, wherein the turntable is provided with a shielding sheet, a side of the reducer is provided with an upright plate, a top of the upright plate is provided with an U-shaped photoelectric switch, a bottom end of the upright plate is fixedly arranged on the fixing bracket, and the shielding sheet is configured for penetrating through a U groove of the U-shaped photoelectric switch.

12. The sample cooling and storage method according to claim 4, wherein the frame body comprises a top frame plate, a bottom frame plate, and a plurality of connection vertical plates connecting the top frame plate with the bottom frame plate, and a middle of the top frame plate and a middle of the bottom frame plate are fixedly connected with the rotating spindle, respectively.

13. The sample cooling and storage method according to claim 12, wherein a top end of the liquid nitrogen storage box is connected to an edge of the top frame plate through a bolt, and the edge of the top frame plate is provided with a positioning slot adapted to the liquid nitrogen storage box.

14. The sample cooling and storage method according to claim 1, wherein a plurality of the liquid nitrogen storage boxes are arranged in a sample storage apparatus, the plurality of the liquid nitrogen storage boxes are divided into at least one cooling box and a plurality of sample storage boxes; and the cooling box performs the programmed cooling on the samples, and the sample storage box stores cooled samples.

15. The sample cooling and storage method according to claim 14, wherein the cooling box performs lifting-type programmed cooling on single-layer samples; the sample storage box stores multi-layer samples; the cooling box and the sample storage box have a same structure and are internally provided with a basket-type sample storage rack, the basket-type sample storage rack is adapted to the liquid nitrogen storage box, the basket-type sample storage rack comprises a storage rack body, a top end of the storage rack body is provided with a connector connected with an output end of the lifting device, and the storage rack body is provided with a plurality of layers of storage grooves with opening front ends from top to bottom in sequence;

the sample storage apparatus comprises a tank body, a top end of the tank body is provided with a tank cover, an inner cavity of the tank body is provided with a rotating frame, the rotating frame comprises a frame body and a rotating spindle connected with the frame body, a bottom end of the rotating spindle is arranged on a bearing seat located in a center of a bottom of the tank body, a top end of the rotating spindle penetrates through the tank cover and is connected with an output shaft of a rotation driving device, a body of the rotation driving device is fixedly arranged on the tank cover, the liquid nitrogen storage box is connected to the frame body, a surface of the tank cover is provided with a transmission port corresponding to the liquid nitrogen storage box, and the transmission port is provided with a tank plug;

the cooling box is internally provided with liquid nitrogen and performs the programmed cooling on the single-layer samples placed in the storage grooves;

the sample storage box is internally not provided with liquid nitrogen, and stores the multi-layer samples through the basket-type sample storage rack; and the cooling box and the sample storage box are arranged on the rotating frame; the lifting device raises and lowers the basket-type sample storage rack in the cooling box and the sample storage box, respectively.

16. The sample cooling and storage method according to claim 15, wherein the lifting device is a linear displacement actuator driven by a servo motor, a body of the linear displacement actuator is mounted on an output end of a three-dimensional movement mechanism, and the three-dimensional movement mechanism is arranged in a casing above the tank body; and an output end of the linear displacement actuator is connected with a mechanical arm which is corresponding to the connector on top of the basket-type sample storage rack;

the casing is also internally provided with a shovel tray pushing mechanism, the lifting device raises and lowers the basket-type sample storage rack in the cooling box and the sample storage box respectively into the casing; and the shovel tray pushing mechanism performs a fetching and storing operation on samples on the basket-type sample storage rack in the cooling box and the sample storage box respectively.

\* \* \* \* \*